United States Patent
Canty et al.

[11] Patent Number: 5,141,125
[45] Date of Patent: Aug. 25, 1992

[54] QUICKPORT CLOSURE DEVICE

[75] Inventors: Thomas M. Canty, Williamsville; Paul J. O'Brien, Hamburg, both of N.Y.

[73] Assignee: J. M. Canty Associates, Inc., Tonawanda, N.Y.

[21] Appl. No.: 743,899

[22] Filed: Aug. 12, 1991

[51] Int. Cl.⁵ .............................................. B65D 43/18
[52] U.S. Cl. ................................... 220/336; 220/344; 220/377
[58] Field of Search ............... 220/262, 263, 336, 344, 220/346, 331, 377

[56] References Cited

U.S. PATENT DOCUMENTS

| | | | |
|---|---|---|---|
| 538,092 | 4/1895 | Wanner, Jr. | 220/336 X |
| 606,025 | 6/1898 | Perry | 220/336 X |
| 743,269 | 11/1903 | Godin | 220/331 X |
| 2,583,085 | 1/1952 | Cambell | 220/331 |
| 2,842,283 | 7/1958 | Smith | 220/262 |
| 2,955,452 | 10/1960 | Myers | 220/336 X |
| 2,964,215 | 12/1960 | Kelton | 220/336 X |
| 3,262,227 | 7/1966 | Pentecost | 220/336 X |
| 3,666,135 | 5/1972 | Kindle | 220/331 |
| 4,398,649 | 8/1983 | Labbe | 220/336 X |

FOREIGN PATENT DOCUMENTS

| | | | |
|---|---|---|---|
| 318824 | 8/1934 | Italy | 220/336 |
| 340646 | 5/1936 | Italy | 220/336 |

Primary Examiner—Stephen Marcus
Assistant Examiner—Stephen K. Cronin
Attorney, Agent, or Firm—James J. Ralabate

[57] ABSTRACT

In using various vessels such as reaction vessels there must be provisions for adding materials to the vessels and for observing the vessel contents. The structure of this invention provides a vessel closure device that provides both of these conveniences. This closure device has an annular seal ring containing spring plungers each located outside areas of exposure to the contamination of the vessel. The seal ring also has two O-ring seals to ensure against leakage. There is also provided a sliding door with a viewing window that is aligned with all openings in the other closure device components in order to provide a clear viewing and addition path to the interior of the vessel.

18 Claims, 4 Drawing Sheets

QUICKPORT CLOSURE DEVICE

This invention relates to a structure used with a containing or mixing vessel and, more specifically, to a novel access and closure device which is easily attached or removed from said vessel.

BACKGROUND OF THE INVENTION

It is known to use various structures together with chemical or other processing tanks or vessels to permit access to the interior of said vessels. Many of these structures involve the use of large bulky attachments that are somewhat difficult to remove when cleaning is required. Several of these prior art closure means contain a plurality of parts that are difficult to clean. In many cases parts become contaminated and can cause serious problems such as when used in the food or pharmaceutical field. Bacteria or other debris can collect in these hard to clean parts and result in contamination of the product being processed.

Also, several of these prior art closures such as those referred to as rolling door closures have no viewing window but rather are constructed of solid panels or parts. While these rolling door closures allow the user to gain entry and provide exit means from a vessel, there is no way to safely view the vessel interior during processing. This could be essential, for example, in chemical processing where change of color or volume or the like is important. Closure means having viewing parts are highly desirable. Those prior art devices that do provide viewing windows usually construct the viewing window from tempered sight glass. It has been found that devices of this nature require frequent replacement of the tempered glass windows because of the frequent failure rate. Tempered glass windows will crack under residual stress and will shatter upon any substantial shock. Also Pyrex type windows do not lend themselves to bolting and unbolting, viewing windows that will not shatter and have a long useful life are also highly desirable. Highly improved viewing windows (Fuseview) with these characteristics are disclosed in U.S. Pat. No. 4,809,862 which issued Mar. 7, 1989.

Also, many viewing windows of prior art devices utilize Pyrex-type materials. In chemical processes viewing of the interior of the vessel is impaired by the product adhering to the window. These windows must be discarded after removal and replaced frequently. The time involved in unbolting the closure, removing the window and rebolting after replacement is significant. In addition, generally, prior art closures use clamping style devices that if opened under pressure could cause a serious failure. This is because when they begin to open the stresses on the component members increases dramatically. This can cause blow-out failure or rapid opening. To prevent this from happening, the prior art devices use an interlocking device to signal electrically or mechanically that pressure is present. The problem is that the interlocking device can be bypassed or fail causing improper operation. A simple, inexpensive structure easily removed and easily cleaned is highly desirable.

To summarize the potential problems in prior art devices are the following points:

(1) relatively expensive and complicated with a plurality of parts;

(2) difficult to reach parts that are easily contaminated;

(3) relatively bulky and extending out to a significant distance from the vessel it is attached to causing potential safety hazzard to users. Also, if space is limited, a small protrusion outwardly from the vessel is important.

(4) difficult to disassemble and clean and reassemble and reattach to the vessel; not sanitary to use;

(5) frequent replacement required of parts especially viewing windows of tempered glass;

(6) interlocking devices that when bypassed can cause faulty operation.

SUMMARY OF THE INVENTION

It is therefore an object of this invention to provide a closure means devoid of the above-noted disadvantages.

Another object of this invention is to provide a low profile closure means that is much less complex and expensive than prior art closures of this type.

A still further object of this invention is to provide an access and closure means that is easily cleaned and keeps possible contamination to a minimum.

A yet further object of this invention is to provide an access and closure means that is much lighter in weight than previously used closure means.

Another further object of this invention is to provide a novel viewing closure means whereby the view window has a substantially longer useful life than previously used viewing windows.

Yet another object of this invention is to provide an access and closure means that can rapidly be removed from the attaching vessel and can easily be cleaned and reinstalled thereon.

Still another object of this invention is to provide an access and closure means having a novel sealing arrangement which substantially seals the unit while at the same time providing possible contamination sites exterior of the process environment. This permits minimum contamination of these sites and easy cleaning access thereto.

These and other objects of this invention which will become apparent upon a reading of this disclosure are provided by an access and closure means comprising in combination a retainer flange, a movable viewing window (or door), a seal ring, and a vessel pad. This access and closure means will be referred to throughout this disclosure as "Quickport".

A pad is provided adjacent the vessel's outer wall for connection to the remainder of the Quickport elements. The pad can be connected by bolts or welded or clamped or any other suitable means. Usually, the vessel itself contains a pad upon which the Quickport pad is attached. The vessel and the Quickport pad and all the other component parts of the unit are annular in order to provide a view and access path from the exterior to the interior of the vessel upon which it will be attached. That is, all components including the pads have central openings all in alignment so that a clear view and access path is provided to the interior of the vessel. Sequentially, after the vessel pad and the Quickport pad, is positioned the seal ring, the movable window or door and then the retainer flange. The seal ring has a novel configuration which is critical to the proper functioning of the invention. As noted, it has an annular structure with cut-out segments around its peripheral portion to accommodate attaching bolts. Also interspersed around the peripheral portion of the seal ring are plunger screws which are outside of the affected reaction or process environment. This prevents them from becoming a source of contamination and makes them easily accessible for cleaning. The function of these spring plungers or plunger screws which are spring-loaded is to apply pressure to the adjacent component parts and ensure a maximum seal therebetween. Two 0-rings are positioned in the seal ring, one 0-ring is located around the lower peripheral portion of the seal ring and the second 0-ring is located on the top face of the seal ring. Each of these 0-rings are easily removed or replaced and together they afford with the spring plungers, maximum sealing capability. One O-ring provides sealing on a horizontal plane and the other O-ring provides sealing on a vertical plane. The seal ring can be constructed of metal, plastic, fiberglass or any other suitable material that will be relatively inert to process conditions.

After the seal ring is positioned, the movable door or window having a Fuseview viewing window is moved into or out of alignment with the central apertures or openings in all the other components of the Quickport. The movable door or window swings out of position when the unit Quickport is opened for depositing materials through the Quickport into the interior of the vessel. While it is highly preferred that the movable door have a viewing window, one may use a solid viewing door, if desired, without a window. After the desired materials are deposited, the movable or sliding window is swung to the closed position and the interior of the Vessel can be viewed therethrough. The terms "door" and "window" as used throughout this disclosure and the claims are used synonymously and are intended to have the same meaning. The movable door pivots on a bolt to permit easy movement to open and close the door. The door is not a detached, separate component which could get lost. The outermost component of the Quickport is adjacent the movable door. This outermost component is the retainer flange. It has an annular configuration with apertures around its periphery to receive bolts or studs to connect the Quickport to the vessel or vessel outer wall. This component, as all the others, can be made from metal, plastic or any other suitable material.

The Quickport closure therefore provides a safe, easy, quick way to gain access to a pressure or vacuum vessel. It features a sliding door which opens laterally to provide full port access. The closure consists of a pad flange (which mates to like ANSI flanges and pads) that holds a floating Teflon seal ring, a retaining flange held apart by spacers and a door or window. As the door is pivoted into the closure, the spring-loaded seal ring is deflected back to allow the door to fit snuggly between the flanges. The spring force creates an airtight seal on the door face and allows the tank to be pressurized or evacuated. Pressure differential holds the door securely in place. Thus, no bolting is involved.

An additional feature offered is the use a "fuseview" window as the door. This creates a viewport as well as an access port in the same opening. Also, due to its construction, it has a very low profile that does not extend away from the vessel. It can also be provided to meet sanitary requirements.

Safety has been designed in from the start. Because the door opens laterally, it has no potential energy from pressure unlike a T-bolt closure which, if unbolted, can fly into the operator with severe injury likely. If the Quickport door is not fully engaged it will not form a seal thereby preventing improper use.

As noted earlier, the Quickport closure of this invention can be attached to a reaction, pressure or vacuum or any other vessel by any suitable means. Typical connecting means are pad bolt-on, nozzle bolt-on, clamping-on or welding directly or indirectly to the vessel.

The Quickport design has several applications. These include acting as a quick access to a process vessel, an end closure to piping connections where a pig (which is a cylindrical device that is put into a pipe to remove scale and other undesirable materials from the pipe walls) can be launched to clean process piping with retrieval out of a Quickport at the opposite end, a filling connection or a quick change orifice plate for the natural gas and refinery industries which use a great many orifice plates in order to meter flow rates. The ability to change them out allows inspection of the process conditions which can lead to much more accurate readings. If an orifice plate corrodes and the opening enlarges, more flow will pass through than intended.

The Quickport closure has a unique seal enhancement over the prior art rolling door above discussed. Although the seal ring moves in a similar manner, the preload or spring loading, is external to the process. This prevents corrosion on the springs, jamming due to material buildup, contamination of the process and crevices aiding bacterial buildup in pharmaceutical applications. A second unique feature is the bolting arrangement of the Quickport. It uses a multiple bolt type connection which eliminates the need for machining a slot through the closure wall which proves to be very expensive in the conventional rolling door. A third feature of the Quickport is the pivoting of the door on the bolt. The door is not a separate component and will not get lost. It also allows for a good mechanical advantage in movement by using a bolt of the closure to easily pivot around and open the door. Another feature of the Quickport is the fact that being bolted allows the unit to be separated and easily cleaned and maintained which is a huge enhancement over the rolling door. In addition, the boltup feature allows machinability of the unit in two major components that then easily assemble together via the bolting.

The window used in the movable window of this invention is described herein. The laminate which adheres to and overcoats both the frame and the viewing window can be made of inorganic glasses, acrylics, other polymeric materials, boron glass and other suitable optically clear materials.

The laminating process generally involves placing a glass plate or other suitable optically clear material over the fused window. The laminate is secured to the inner face of the window and frame by a preselected adhesive that will be compatible with both the window and frame, and yet not interfere with the optical clarity of the window and laminate. The adhesive used to secure the laminate was cyanoacrylate, but other suitable adhesives may be used such as suitable optically clear epoxies such as polyvinyl butyral. A high temperature laminate with a high shear strength is very important to this invention.

The laminated window of this invention provides the maximum strength and safety in a safety sight glass. It has a fused glass to metal seal cartridge that provides radial compression on the glass. The compression is maintenance free and much higher than mechanical compression, providing a stronger glass window. In addition, misadjustment of mechanical radial compression can cause failure. The sight glass of this invention provides an inside glass face laminated to the fuseview cartridge. The laminated face insures that only glass is exposed to the process. The glass face only acts in compression. The laminated fuseview can be provided for higher pressure than shown. Laminated glass faces can be made of quartz, mica or other suitable materials. This allows for the best use of each material along with a design that uses both fusing and laminating for maximum safety. For further particulars on the window used, see U.S. Pat. No. 4,809,862.

BRIEF DESCRIPTION OF THE DRAWINGS

FIG. 5 is a plan view of the Quickport as it is attached to a vessel wall by a pad bolt-on.

FIG. 6 is a plan view of the Quickport as it is attached to a vessel wall by a nozzle bolt-on.

FIG. 7 is a plan view of the Quickport as it is attached to a vessel wall by a weld-in.

DESCRIPTION OF THE DRAWING AND PREFERRED EMBODIMENT

Figure 1:
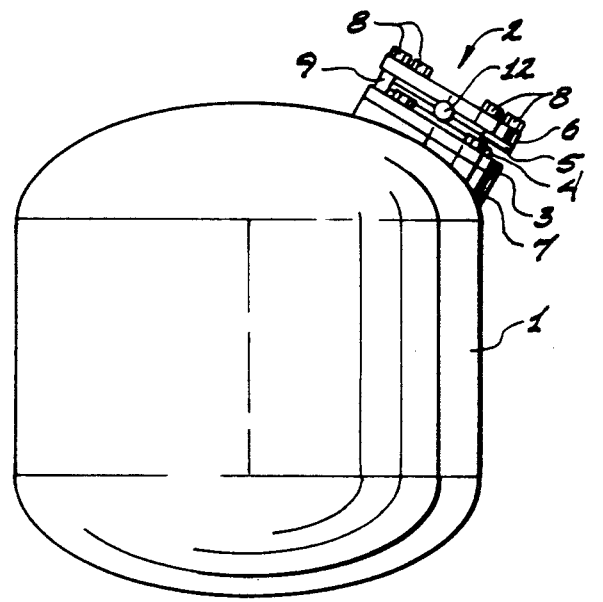
FIG. 1 is a perspective view of the Quickport closure as it is attached to a vessel.

In FIG. 1, a reactor (or other type) pressure vessel 1 is shown including the Quickport closure 2 of this invention. The vessel 1 may also contain other elements such as processing cameras, explosion proof lighting, level flow indicators, etc., but for purposes of this invention, only the Quickport 2 is shown attached to the outer wall of vessel 1.

Figure 2:
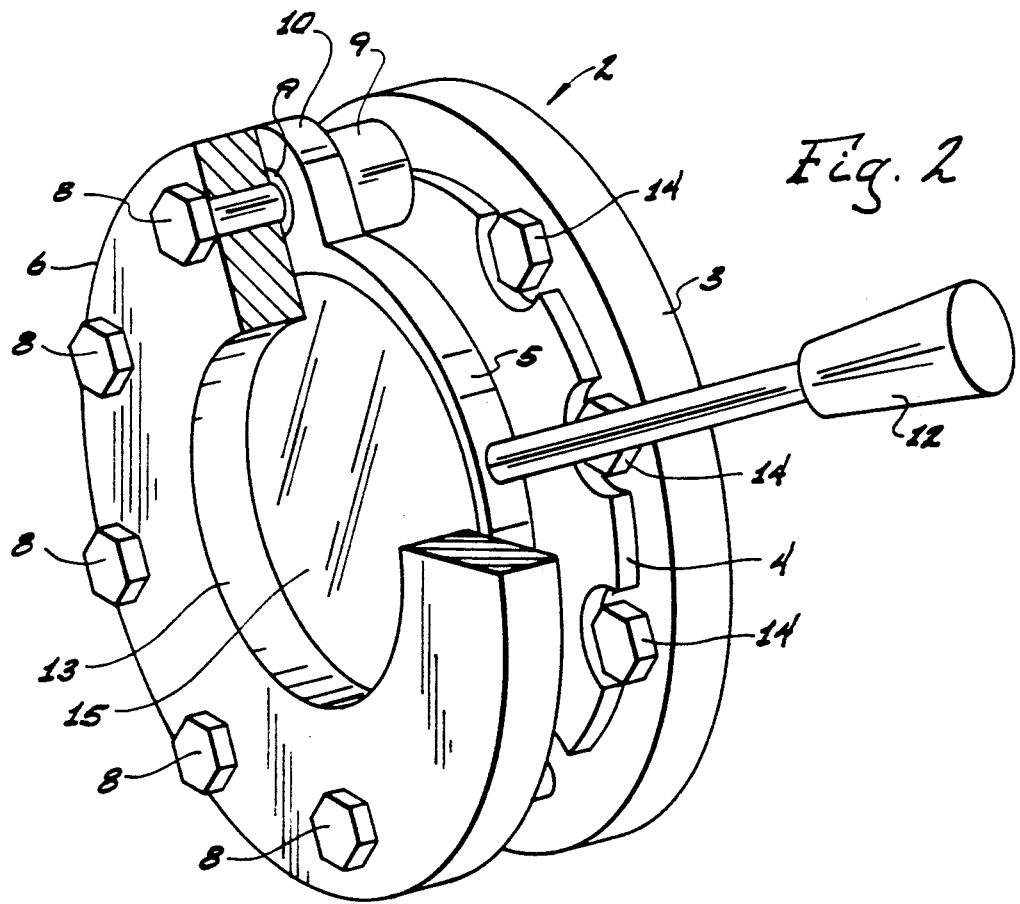
FIG. 2 is a closed perspective view of the assembled Quickport closure in a partial cutaway view.

In FIGS. 1 and 2 the Quickport closure 2 main elements starting from the outer vessel wall are a Quickport attachment pad 3, a seal ring 4, a sliding door 5, and a retainer flange 6. The vessel 1 generally has an annular vessel pad 7 upon which the Quickport closure 2 is mounted. Bolts or studs 8 are located around the peripheral portion of retainer flange 6 and connect to Quickport pad 3. Spacers 9 surround and protect the studs 8 between components. Other elements such as gaskets (not shown in FIGS. 1 and 2) may be used between components of the Quickport or vessel if desirable. For example, the pad flange 3 mates with a vessel flange pad 7 which has a floating Teflon seal ring. The sliding door 5 opens laterally via handle 12 to provide full port access. As the door 5 is pivoted into the closure (between the seal ring 4 and the retainer flange 6), the spring-loaded seal ring 4 is deflected back to allow the door to fit snuggly between the seal ring and retainer flange 6. This spring force creates an airtight seal on the door face and allows the tank 1 to be pressurized or evacuated. Pressure differential caused by spring plungers 11 (see FIG. 8) in seal ring 4 holds the door securely in place. Movable door 5 is movably attached to a bolt or spacer 9 by an attachment ring 10 which also is movable around spacer 9. Movable door 5 has a handle 12 which is used to either open or close or otherwise move door 5 to the desired position. As clearly shown, retainer flange 6 and all of the other components of Quickport closure 2 and vessel pad 7 have an annular configuration with hole 13 in the center to provide a clear view and access path into the interior of vessel 1. The Quickport attachment pad 3 also has bolts 14 for attachment to vessel pad 7. FIG. 2 shows the sliding or movable door 5 in a closed position and FIG. 4 shows door 5 in an open position as it pivots via ring 10 upon spacer 9.

The central window 15 of door 5 is preferably constructed as a laminated window by the process disclosed in U.S. Pat. No. 4,809,862. This laminated window 15 provides the maximum strength and safety in a safety sight glass. It has a fused glass-to-metal seal cartridge that provides radial compression on the glass. It is critical to the present invention that Quickport closure 2 contain this type window for without it frequent ruptures may occur causing a serious safety hazard. While fused unlaminated windows may be used, the windows of U.S. Pat. No. 4,809,862 provide much superior results.

Figure 3A:
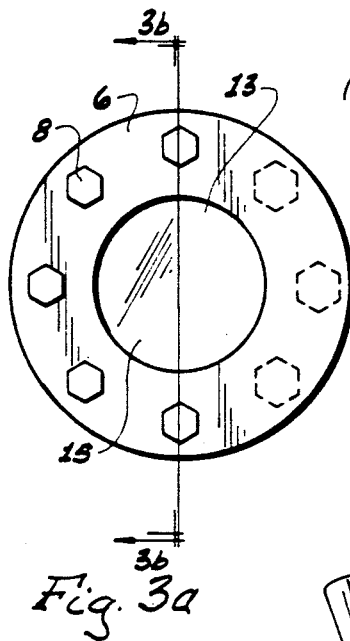
FIGS. 3a and 3b illustrate a front and an exploded disassembled view of the Quickport closure and its component parts.
Figure 3B:
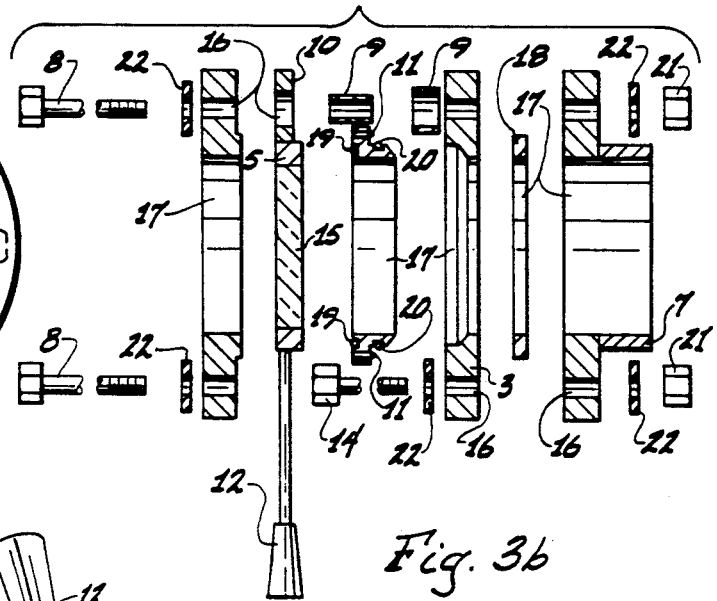

In FIGS. 3a and 3b a front and an exploded plan view of the Quickport 2 of this invention is shown. Retainer flange is illustrated to the left in FIG. 3 from a front view. Bolts or studs 8 are shown as they are located around the outer peripheral portion of flange 6. Studs 8 alone may be used with nuts, if desired. The central aperture 13 is shown in flange 6 as it is aligned with apertures 17 in the other components and the glass window 15 in sliding door 5. This provides a clear unobstructed view from outside this vessel 1 to the interior of vessel 1. Bolts and nuts 8 also are aligned as seen in the exploded view with component stud openings 16 in the other components. Attachment ring 10 is shown on the top of movable door 5 also having a stud (or spacer) opening 16. A gasket 18 is shown between vessel pad 7 and Quickport pad 3 for proper sealing attachment. Spring plungers 11 are shown in seal ring 4 as are top and center O-rings 19 and 20 respectively. The spring plungers 11 are outside the reaction or process environment and are therefore not exposed to process conditions. This also is critical to the present invention since prior art devices often contain crevices or protrusions that collect contaminants and must be cleaned or disposed of very often. The location of these plungers 11 and 0-rings 19 and 20 are extremely important to the proper functioning of the Quickport closure 1 of this invention. This is because both contribute significantly to the maximum sealing effect provided for in this invention. Nuts 21 and washers 22 are needed to attach on to studs 8 to hold all components in place.

Figure 4:
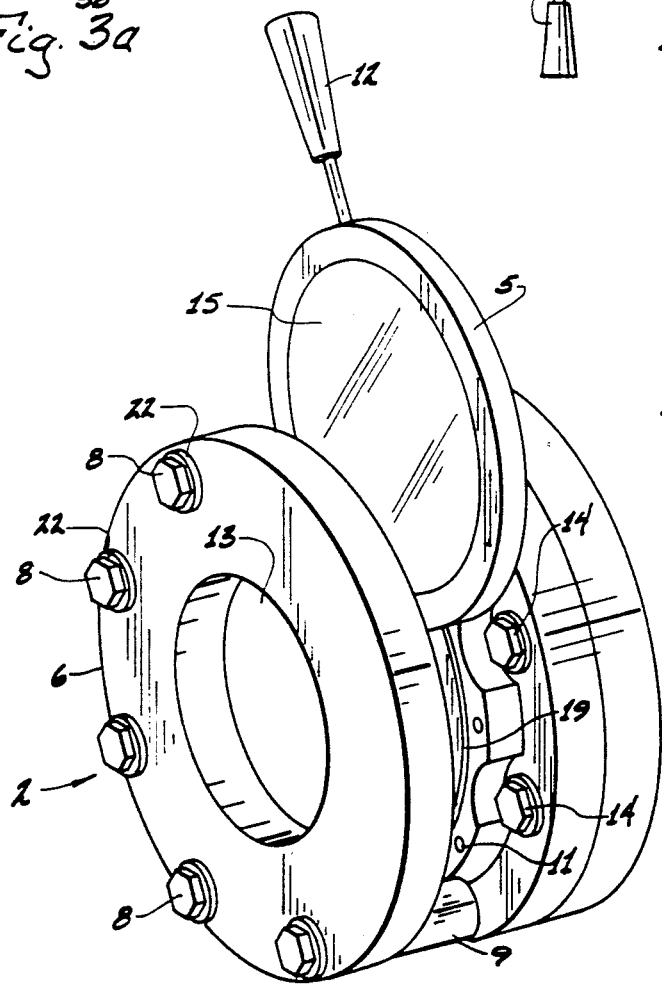
FIG. 4 is an enlarged cutaway open view of the Quickport closure of this invention.

In FIG. 4 Quickport closure 2 shown as door 5 with glass or other clear window 15 is pivoted outwardly upon spacer 9 and attachment ring 10. Spacer 9 is shown in two pieces for clarity. By pulling handle 12 upwardly the entry port through apertures 13 and 17 is clear and forms a complete opening to the entrance or interior of vessel 1. Once the material or reactants are deposited through this opening into vessel 1, door 5 is swung shut and the process initiated. The progress of the reaction or the activity within vessel 1 now can be safely viewed through glass window 15. For the sake of clarity, the details of seal ring 4 are not shown in this figure but its location (at 4) between door 5 and Quickport pad 3 is indicated. Details of the seal ring 4 are shown in FIG. 8.

Figure 5:
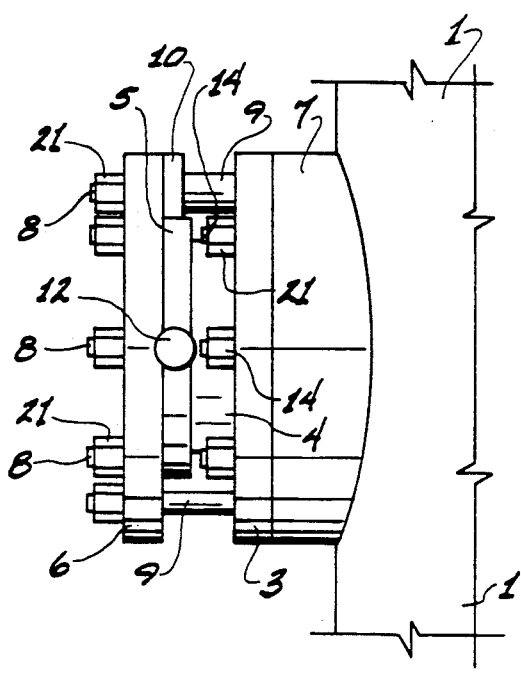
Figure 6:
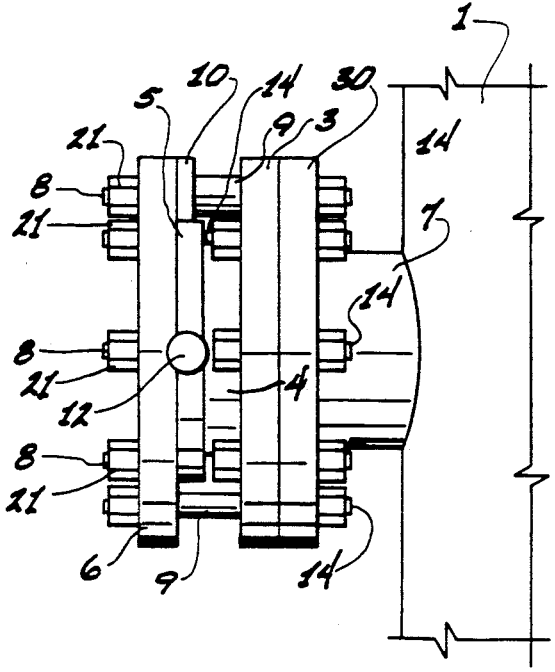

In FIGS. 5 and 6 the Quickport closure 2 is attached to a vessel 1 by the use of bolts or studs 14. In each FIG. 5 and 6 the closure pad 3 is bolted to an existing vessel pad or nozzle 7 by putting bolts 8 through holes in pad 7. The pad or nozzle 7 is integral with and part of vessel 1, therefore closure 2 is easily attached thereto. In FIG. 5 studs 8 and studs 14 screw into the pad 3. In FIG. 6 studs 8 and 14 insert through the nozzle pad 30 via bolt holes therein and are secured by nuts 21 on top and bottom.

Figure 7:
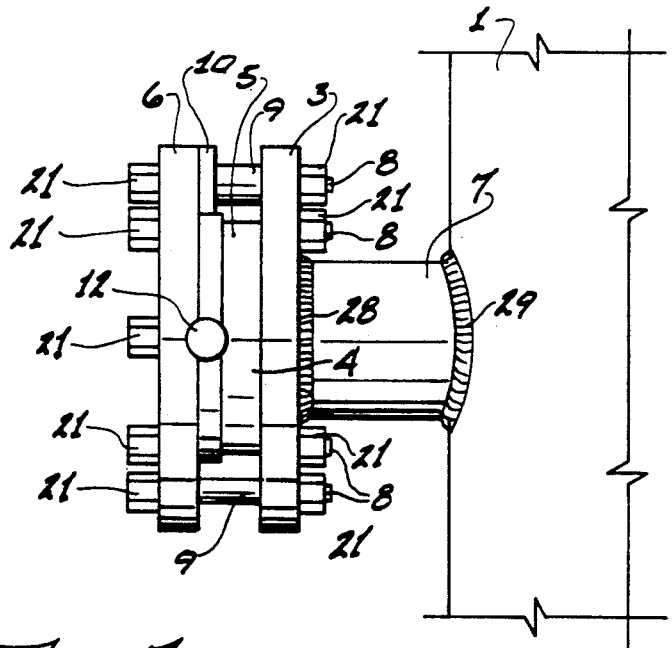

In FIG. 7 the Quickport closure 2 is attached to a vessel 1 by welding. In this embodiment the pad 3 (which is secured to the remainder of the closure 2) is welded at weld 20 to nozzle extension 7. The closure assembly 2 is furnished in this embodiment to the customer for welding directly to nozzle 7 or in lieu thereof can be supplied with a nozzle 7 to be welded to the vessel 1 at weld 29. Studs 14 are not used in this embodiment.

Figure 8:
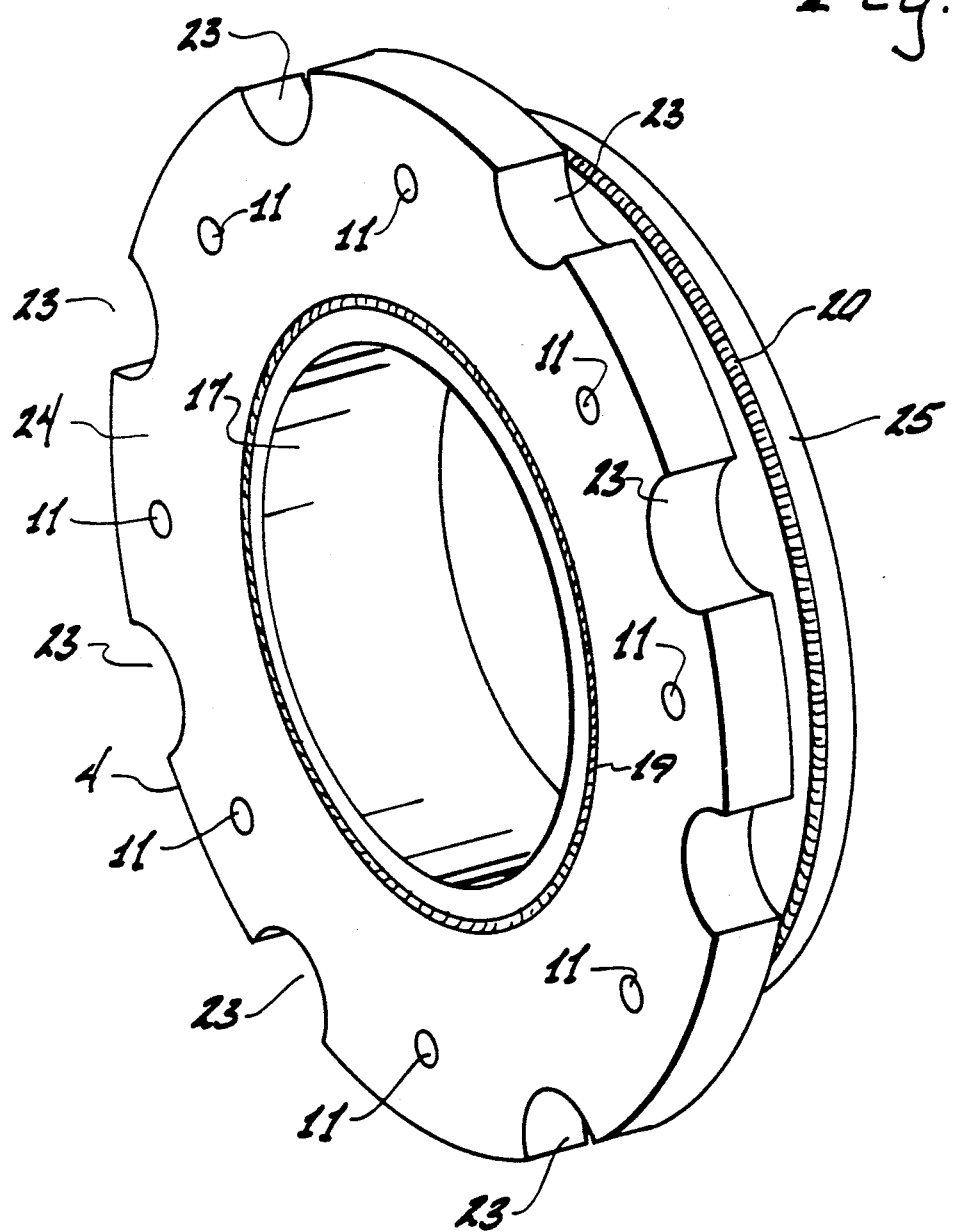
FIG. 8 is a perspective view of the seal ring used in the Quickport closure of this invention.

In FIG. 8 the seal ring 4 used in the Quickport closure 2 of the present invention is illustrated. The seal ring 4 has cut-out portions 23 to accommodate spacers 9 or studs 8 as they connect all components of Quickport closure 2. The seal ring 4 has an annular configuration with a central opening 17 which is part of the unobstructed view path to the interior of vessel 1. Around the outer ring of seal ring 4 are located spring plungers 11 which maintain pressure throughout the assembled components to provide a maximum seal therebetween. The location of these plungers 11 outside the exposure of process conditions is important to this invention. They are easily cleaned or removed when necessary or desirable. They extend through the upper ring portion 24 and contact the adjacent components. Also located in the upper face of upper ring 24 is an 0-ring seal 19 which also with 0-ring 20 and plungers 11 maintain a maximum seal. 0-ring 20 is located in the lower ring 25 of seal 4. It is understood that in closure 2 a single seal ring is normally used. However, in orifice plates, line blinds and vacuum valves two-seal rings are used to seal upstream and downstream in the pipeline that they are inserted in.

The preferred and optimumly preferred embodiments of the present invention have been described herein and shown in the accompanying drawings to illustrate the underlying principles of the invention, but it is to be understood that numerous modifications and ramifications may be made without departing from the spirit and scope of this invention.

What is claimed is:

1. A vessel closure device adapted to be connected to a vessel comprising in combination as connected components of said vessel closure: an attachment pad, an annular seal ring, a sliding door and a retainer flange, said sliding door movably connected between said annular seal ring and said retainer flange, said seal ring comprising an upper ring section and a lower ring section, said upper ring section containing a plurality of spring plungers each located substantially outside of areas of exposure to any substantial contact or contamination from activity within said vessel, said upper ring section also containing on an upper face an O-ring seal, said lower ring section comprising around its peripheral portion and O-ring seal, all of said connected components having an annular configuration with aligned central openings creating thereby a clear view and access path from said closure device to the interior of said vessel.

2. The closure device of claim 1 wherein said attachment pad comprises connecting means, said connecting means adapted to be secured to said vessel.

3. The closure device of claim 1 wherein said sliding door is positioned between said seal ring and said retainer flange.

4. The closure device of claim 1 wherein said sliding door is pivotly connected to a component securing means and is movable therearound.

5. The closure device of claim 1 wherein said sliding door has a handle, said handle extending outwardly from a peripheral portion of said sliding door.

6. The closure device of claim 1 wherein said sliding door comprises a viewing window in substantial viewing alignment with said central openings of said components.

7. The closure device of claim 1 wherein said sliding door comprises a viewing window having a fused glass to metal seal that provides radial compression on the fused glass.

8. The closure device of claim 1 wherein the O-ring seal on said upper ring section provides a substantially airtight sealing means on an adjacent face of said sliding door, and wherein the O-ring seal on said lower ring section provides a substantially airtight sealing means on an adjacent face of said attachment pad.

9. The closure device of claim 1 wherein said sliding door is movable to positions that at least partially close or partially open said clear view and access path formed by the other components.

10. An opening and closure device adapted for connection to a vessel comprising as major connected components thereof: an attachment pad, an annular seal ring, a movable or sliding door and a retainer flange, said sliding door movably connected between said annular seal ring and said retainer flange, said seal ring comprising an upper ring section and a lower ring section, said upper ring section containing a plurality of spring plungers each located substantially outside of areas of exposure to any substantial contact or contamination from activity within said vessel, said upper ring section also containing on an upper face thereof an O-ring seal, said lower ring section comprising around its peripheral portion an O-ring seal, all of said components having an annular configuration with aligned central openings creating thereby a clear view and access path from said closure device to the interior of said vessel, said retainer flange having a central opening and around said central opening having an outside and inside face, said inside face being adjacent said sliding door, a plurality of studs extending through said retainer flange and connecting all of said components together.

11. The device of claim 10 wherein said attachment pad comprises connecting means, said connecting means adapted to be secured to said vessel.

12. The closure device of claim 10 wherein said sliding door is positioned between said seal ring and said retainer flange.

13. The closure device of claim 10 wherein said sliding door is pivotly connected to a component securing means and is movable therearound.

14. The closure device of claim 10 wherein said sliding door has a handle, said handle extending outwardly from a peripheral portion of said sliding door.

15. The closure device of claim 10 wherein said sliding door comprises a viewing window in substantial viewing alignment with said central openings of said components.

16. The closure device of claim 10 wherein said sliding door comprises a viewing window having a fused glass to metal seal that provides radial compression on the fused glass.

17. The closure device of claim 10 wherein the O-ring seal on said upper ring section provides a substantially airtight sealing means on an adjacent face of said sliding door, and wherein the O-ring seal on said lower ring section provides a substantially airtight sealing means on an adjacent faced of said attachment pad.

18. The closure device of claim 10 wherein said sliding door is movable to positions that at least partially close or partially open said clear view and access path formed by the other components.

* * * * *